(12) United States Patent
Cote

(10) Patent No.: US 11,590,900 B2
(45) Date of Patent: Feb. 28, 2023

(54) LADDER RACK FOR A VEHICLE

(71) Applicant: TECHNO-FAB 9000 INC., Saint-Hyacinthe (CA)

(72) Inventor: Guy Cote, Mont St-Hilaire (CA)

(73) Assignee: Techno-Fab 9000 Inc., Saint-Hyacinthe (CA)

( * ) Notice: Subject to any disclaimer, the term of this patent is extended or adjusted under 35 U.S.C. 154(b) by 182 days.

(21) Appl. No.: 16/999,602

(22) Filed: Aug. 21, 2020

(65) Prior Publication Data
US 2021/0053502 A1    Feb. 25, 2021

Related U.S. Application Data

(60) Provisional application No. 62/890,134, filed on Aug. 22, 2019.

(51) Int. Cl.
*B60R 9/042*    (2006.01)
*B60R 9/048*    (2006.01)

(52) U.S. Cl.
CPC .......... *B60R 9/0423* (2013.01); *B60R 9/0485* (2013.01)

(58) Field of Classification Search
CPC ............................ B60R 9/0423; B60R 9/0485
See application file for complete search history.

(56) References Cited

U.S. PATENT DOCUMENTS

| | | | | |
|---|---|---|---|---|
| 3,963,136 A | * | 6/1976 | Spanke | B60R 9/0423 224/310 |
| 4,008,838 A | * | 2/1977 | Correll | B60R 9/0485 182/127 |
| 4,262,834 A | * | 4/1981 | Nutt | B60R 9/0485 182/127 |
| 7,097,409 B2 | * | 8/2006 | Richter | B60R 9/0423 182/127 |
| 10,017,124 B2 | * | 7/2018 | Lachance | B60R 9/0423 |

FOREIGN PATENT DOCUMENTS

EP    0340076    * 6/1989    ............... B60R 9/04

\* cited by examiner

*Primary Examiner* — Derek J Battisti
(74) *Attorney, Agent, or Firm* — France Cote; Benoit & Cote Inc.

(57) ABSTRACT

A ladder rack for supporting a ladder on a vehicle. The ladder rack comprises a supporting arrangement anchored only along a single edge area of a rooftop, the supporting arrangement comprising a first load-bearing member entirely extending over the rooftop within an edge of the rooftop and a second load-bearing member extending substantially parallel to the first load-bearing member with a lateral offset, outside the rooftop and away from the edge of the rooftop. A ladder-supporting arrangement holds the ladder and connects to the first load-bearing member and to the first load-bearing member for supporting a weight of the ladder. The remainder of the rooftop surface is exempt of any member and is free for other purposes. The ladder is held on a side of the vehicle with an offset to be able to open a sliding door on the same side of the vehicle as the ladder rack.

15 Claims, 18 Drawing Sheets

Storage position

Loading/unloading position

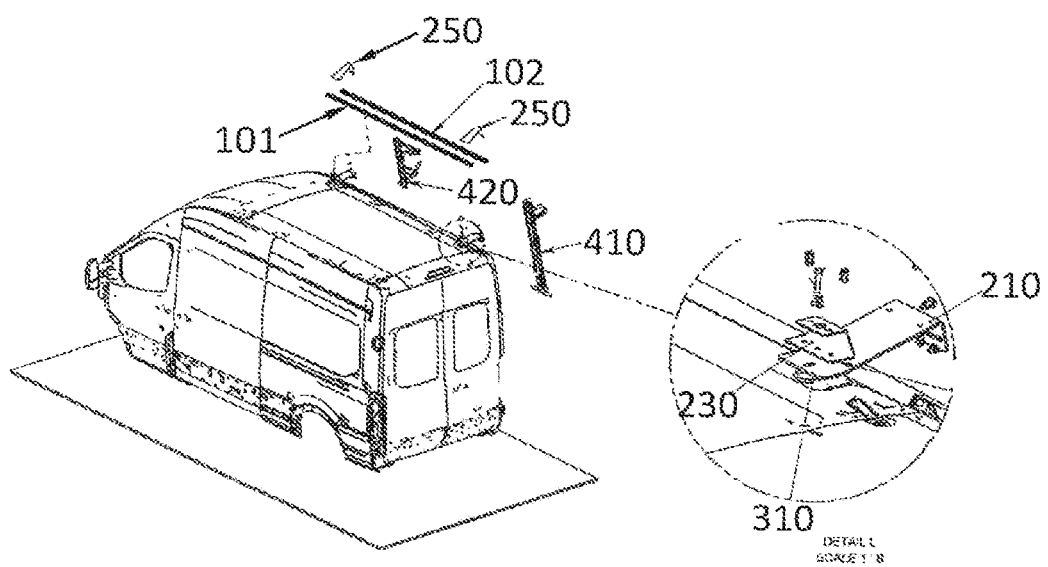
FIGURE 8A  FIGURE 8B

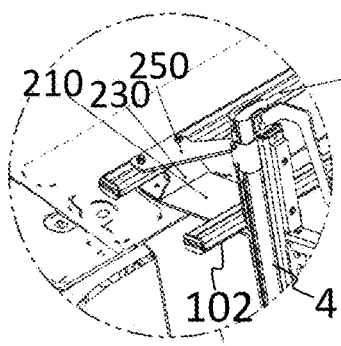
FIG. 9C
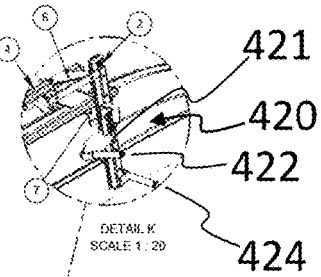
FIG. 9D
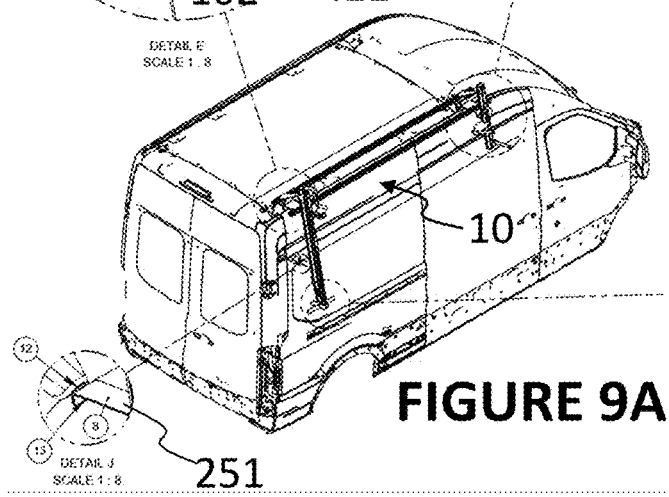
FIGURE 9A
FIG. 9B
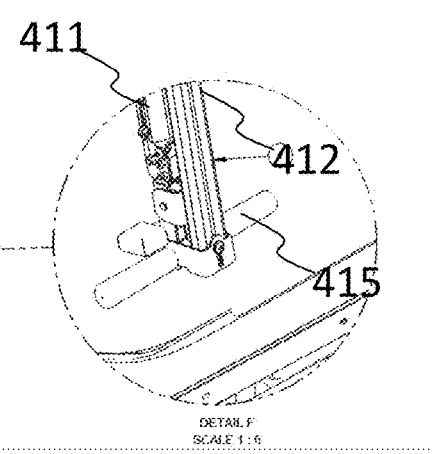
FIG. 9E

LADDER RACK FOR A VEHICLE

CROSS-REFERENCE TO RELATED APPLICATIONS

This application claims the priority or benefit of U.S. provisional patent application 62/890,134, filed Aug. 22, 2020, the specification of which is hereby incorporated herein by reference in its entirety.

BACKGROUND

(a) Field

The subject matter disclosed generally relates to utility vehicle accessories. More specifically, it relates to a ladder rack for a vehicle with a minimal footprint on the vehicle's rooftop.

(b) Related Prior Art

Utility vehicles such as box trucks often need to transport various pieces of equipment. Among others, a ladder is frequently required, for example if the vehicle is used by field workers for utility or telecommunication companies or by construction workers. Since a ladder is long, many people choose to install a ladder rack on the vehicle to hold the ladder outside of the vehicle.

There are various types of ladder racks. Most often, the ladder rack is installed on the rooftop or on the side of the vehicle. A mechanism is used to bring the ladder down to be able to grab it and use it, and to bring the ladder up onto the rooftop for transportation or storage.

There is always a need to make this equipment safer to operate and easier to use.

BRIEF DESCRIPTION OF THE DRAWINGS

Further features and advantages of the present disclosure will become apparent from the following detailed description, taken in combination with the appended drawings, in which:

FIGS. 8A-8B are exploded views illustrating the installation of the ladder rack, with details on how to secure the ladder rack on the anchors by the edge of the rooftop, according to an embodiment of the invention;

FIGS. 9A-9E are perspective views illustrating the ladder rack, with details on several portions thereof, according to an embodiment of the invention;

It will be noted that throughout the appended drawings, like features are identified by like reference numerals.

SUMMARY

Figure 1:
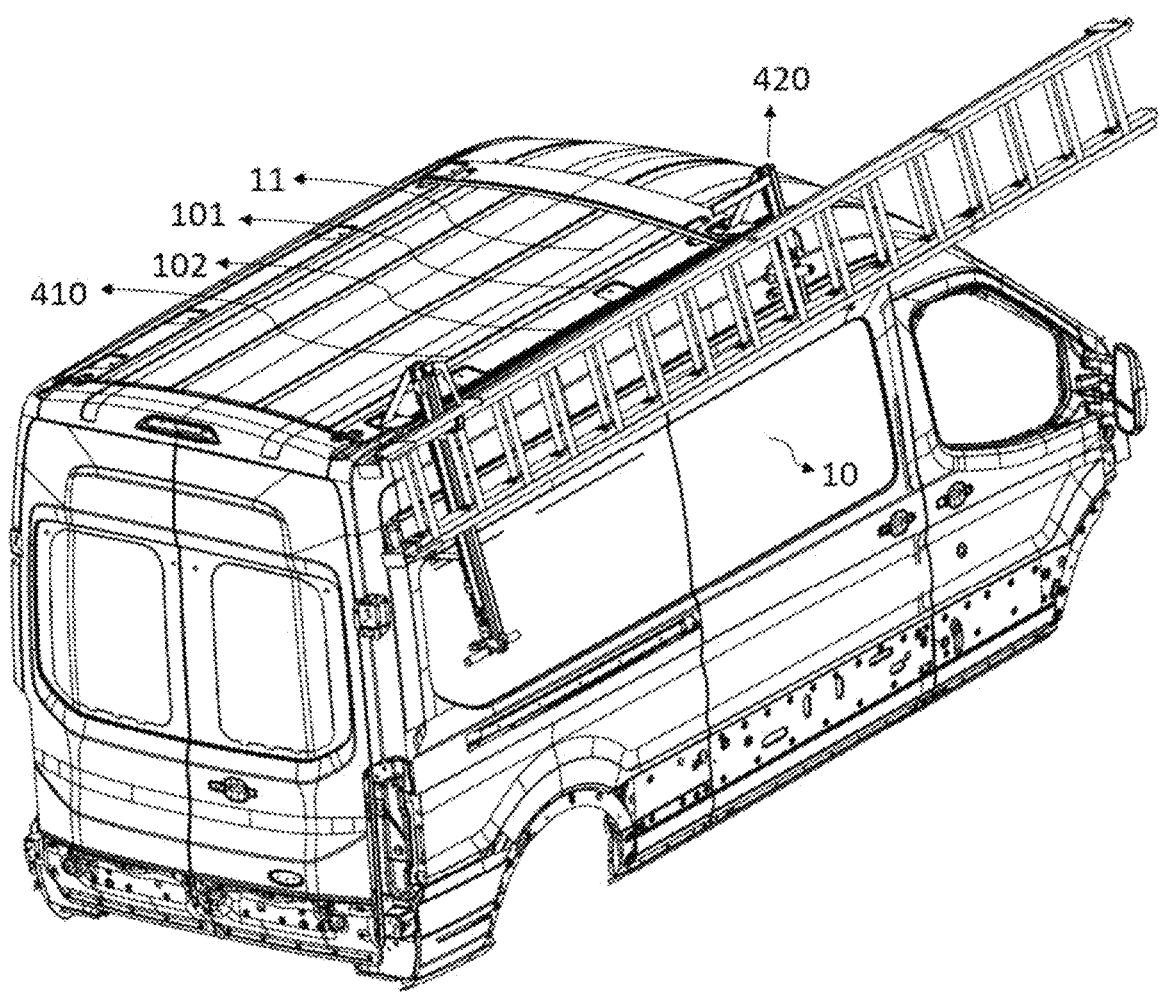
FIG. 1 is a perspective view illustrating a ladder rack supporting a ladder on a vehicle with minimal footprint on the rooftop, according to an embodiment of the invention.

According to an aspect of the invention, there is provided a ladder rack for supporting a ladder on a vehicle, the ladder rack comprising a supporting arrangement anchored on a rooftop of the vehicle having two edges, the supporting arrangement anchored only along a single edge thereof, and comprising bars spanning across the single edge of the rooftop, on either side of the single edge and being both parallel to the single edge of the rooftop of the vehicle, a weight of the ladder being distributing by the bars.

According to an embodiment, the bars distributing the weight of the ladder comprise a first bar and a second bar, wherein the supporting arrangement is secured to anchors at predetermined locations on the rooftop of the vehicle, the ladder rack further comprising an offset supporting member which supports the second bar with a lateral offset relative to the first bar, the offset supporting member being also secured to the anchors.

According to an embodiment, the anchors at predetermined locations on the rooftop of the vehicle are located on a same edge area by the single edge of the rooftop, while any anchors on an other opposite one of the two edges of the vehicle are not used for anchoring the ladder rack.

According to an embodiment, the ladder rack further comprises a fixed bar arrangement for holding a first portion of the ladder, the fixed bar arrangement being secured to the supporting arrangement.

According to an embodiment, the ladder rack further comprises a sliding bar arrangement comprising a fixed bar secured to the supporting arrangement and a sliding bar, in sliding arrangement with the fixed bar, for holding a second portion of the ladder, for sliding upwardly or downwardly and pivot the ladder with respect to the first portion held by the fixed bar arrangement.

According to an embodiment, the vehicle comprises a sliding door on a same side of the vehicle as the ladder rack, wherein the fixed bar comprises a wall support member which secures the fixed bar to a side wall portion of the vehicle which is not the sliding door and which is rearward from a most rearward location reachable by the sliding door.

According to an embodiment, the offset supporting member is provided in a pair, one being secured to the fixed bar arrangement, and another one secured to the fixed bar of the sliding bar arrangement.

According to an embodiment, the ladder rack further comprises a support, provided in a pair secured to the first bar, one being further secured to the fixed bar arrangement, and another one further secured to the fixed bar of the sliding bar arrangement.

According to an embodiment, the bars distributing the weight of the ladder comprise a first bar and a second bar, further comprising a spacer between the anchors and the first bar to ensure the first bar and the second bar are approximately at a same height relative to the rooftop.

According to another aspect, there is provided a ladder rack for supporting a ladder on a vehicle, the ladder rack comprising:
   a supporting arrangement anchored only along a single edge area of a rooftop, the supporting arrangement comprising a first load-bearing member entirely extending over the rooftop within an edge of the rooftop and a second load-bearing member extending substantially parallel to the first load-bearing member with a lateral offset, outside the rooftop and away from the edge of the rooftop; and
   a ladder-supporting arrangement for holding the ladder, the ladder-supporting arrangement connecting to the first load-bearing member and to the second load-bearing member for supporting a weight of the ladder.

According to an embodiment, the first load-bearing member entirely extends over said single edge area the rooftop, leaving a remainder of the rooftop free from the supporting arrangement of the ladder rack.

According to an embodiment, the first load-bearing member is a first bar and second load-bearing member is a second bar, wherein the supporting arrangement is secured only to anchors at predetermined locations in the single edge to leave free any other anchor of the vehicle not within the single edge area.

According to an embodiment, the ladder rack further comprises an offset supporting member which supports the second bar with a lateral offset relative to the first bar, the offset supporting member being also secured to the anchors.

According to an embodiment, the ladder-supporting arrangement comprises a fixed bar arrangement for holding a first portion of the ladder, the fixed bar arrangement being secured to the supporting arrangement.

According to an embodiment, the ladder-supporting arrangement comprises a sliding bar arrangement comprising a fixed bar secured to the supporting arrangement and a sliding bar, in sliding arrangement with the fixed bar, for holding a second portion of the ladder, for sliding upwardly or downwardly and pivot the ladder with respect to the first portion held by the fixed bar arrangement.

According to an embodiment, the vehicle comprises a sliding door on a same side of the vehicle as the ladder rack, wherein the fixed bar comprises a wall support member which secures the fixed bar to a side wall portion of the vehicle which is not the sliding door and which is rearward from a most rearward location reachable by the sliding door.

According to an embodiment, the offset supporting member is provided in a pair, one being secured to the fixed bar arrangement, and another one secured to the fixed bar of the sliding bar arrangement.

According to an embodiment, the ladder rack further comprises a support, provided in a pair secured to the first bar, one being further secured to the fixed bar arrangement, and another one further secured to the fixed bar of the sliding bar arrangement.

According to an embodiment, the ladder rack further comprises a spacer between the anchors and the first load-bearing member to ensure the first load-bearing member and the second load-bearing member are approximately at a same height relative to the rooftop.

According to an embodiment, the spacer maintains the first load-bearing member and the second load-bearing member with an angular tilt relative to each other.

DETAILED DESCRIPTION

There is now described a ladder rack 10 having a minimal footprint on the rooftop of the vehicle while allowing opening of the sliding door on the side of the vehicle.

Indeed, most ladder racks are installed on the rooftop of the vehicle. This installation always comprises arms which traverse the surface of the roof in order to be safely anchored to the roof. These arms or bars occupy space on the roof (nothing can be installed thereon).

However, in many circumstances, utility vehicles may benefit from having specialized equipment on their rooftop, such as an aerial lift, often used by field workers for utility or telecommunication companies. In other cases, workers spend significant time in the utility vehicle, and the installation of an air conditioner, i.e., a standalone and voluminous apparatus to be installed on the vehicle rooftop, would be appropriate. These options are incompatible with a ladder rack occupying a significant surface on the rooftop, i.e., when a ladder rack is used on the rooftop, as it is typically the case, then the aerial lift or rooftop air conditioner cannot be installed.

To be able to use the roof, ladder racks may otherwise be installed on a side of the vehicle. This type of installation lacks compatibility with the use of sliding doors on the side of the vehicle. Side ladder racks are seldom used because box trucks and similar vehicles often have a sliding door or other type of door on the side and installing a ladder rack on the side would prevent the opening of the door, or it more simply, it can be impossible to install such a ladder rack in this situation.

Figure 2:
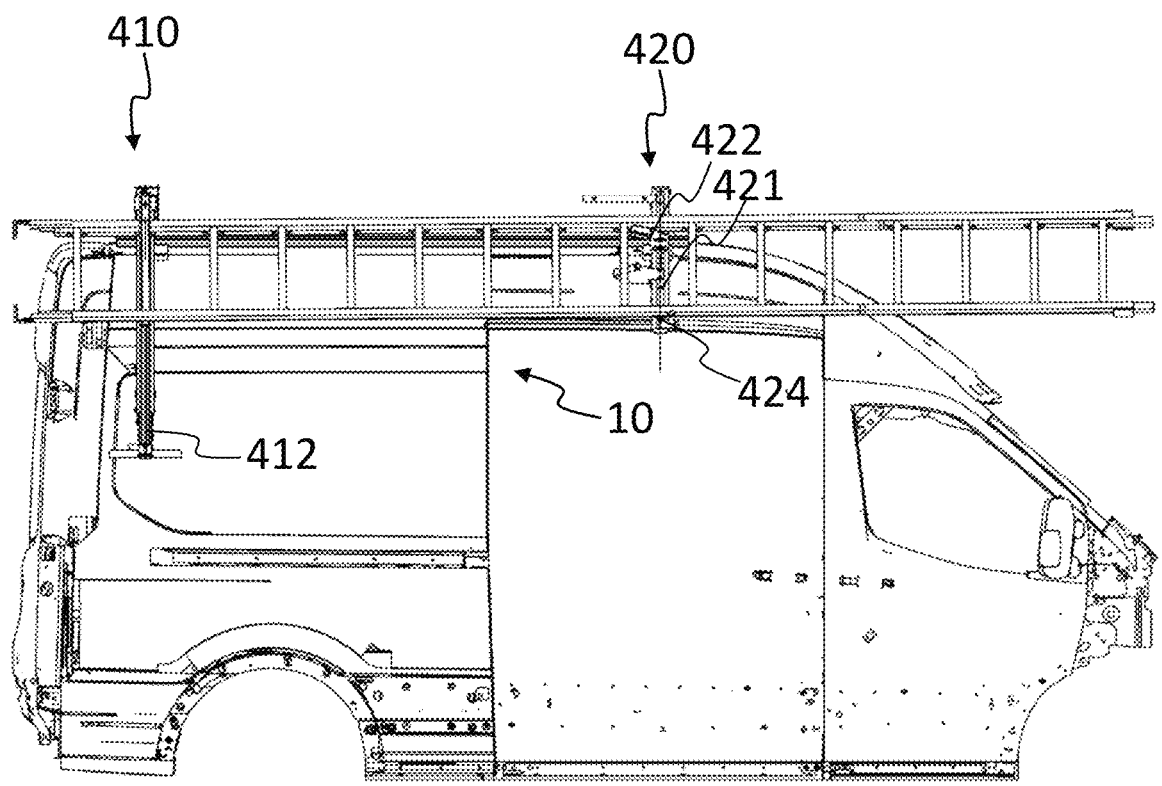
FIG. 2 is a side view illustrating the ladder rack of FIG. 1.

The ladder rack 10 disclosed herein addresses these issues by being anchored on the rooftop but only at the edge thereof, not having any element traversing the surface of the rooftop, thus freeing the rooftop surface by having the ladder stored right above the side surface of the vehicle, without having blocking the operation (opening/closing) of a side door of the vehicle. More specifically, the ladder rack 10 disclosed herein occupies only a small area on the rooftop by extending only along the edge of the roof, and comprises a supporting arrangement 11 which spans across the edge of the roof to provide necessary spacing, both laterally and vertically, to ensure that the supported ladder does not prevent the opening of the sliding door on the side of the vehicle where the ladder rack 10 is installed. FIG. 1 shows the ladder rack 10 in storage position (i.e., with the ladder loaded thereon and well secured for transportation), extending only along the edge of the vehicle and occupying no surface on the rooftop other than a small area along the edge only. A ladder is held in place horizontally, not on the rooftop either, and instead offset from the rooftop surface, thus actually freeing the space on the rooftop for other purposes, as shown in FIG. 1-2 or 9A.

Figure 13:
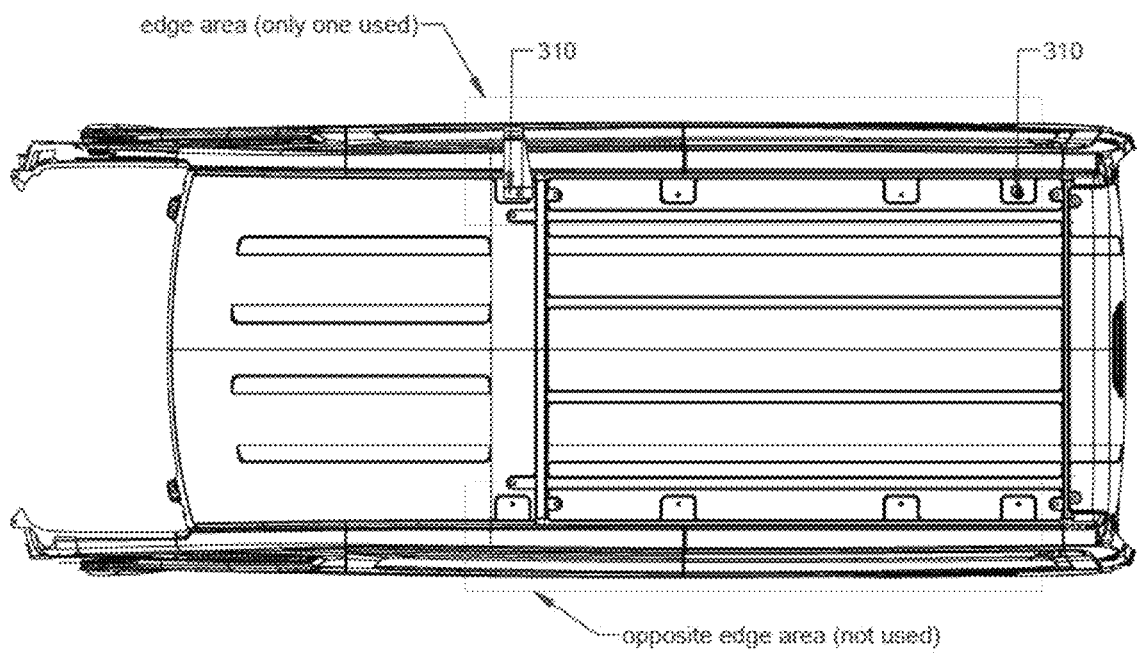
FIGS. 13-14 are a top view and a perspective view illustrating the standard anchors on a typical truck to be used for anchoring the ladder rack, according to an embodiment of the invention.

The edge is defined in its usual meaning, i.e., where the roof and the side meet, or where the roof becomes the side of the vehicle. The edge area is the area by the edge comprising anchors for the supporting arrangement of the rack and over which a portion of the supporting arrangement of the rack extends. The edge area can be considered to extend from to edge to about 5 centimeters, or about 10 centimeters, or about 15 centimeters, or about 20 centimeters within the rooftop starting from the edge. This distance from the edge defines the edge area, on the rooftop surface, which is within a reasonable distance from the edge to be able to consider that the remainder of the rooftop surface is free. Said edge area can be defined as from 1% to about 5%, or to about 10%, or to about 15%, or to about 20%, or to about 25% of the rooftop's width, but not more than that, to ensure that at least three quarters or more of the rooftop's width is free from the supporting arrangement of the rack. As shown in FIG. 13, while there are two sides of the vehicles and therefore two opposite edges and their corresponding edge area, only one is used while the other, opposite edge area is deliberately unused (as far as the ladder rack is concerned) and left for other purposes. The supporting arrangement, and more generally the ladder rack including the ladder itself, are all exempt of any member or portion which extend over the rooftop within the edge area on which the ladder rack is installed. Everything (ladder rack, supporting arrangement, ladder-supporting members and ladder) is either above a single edge area or away from the edge of the vehicle.

Figure 5:
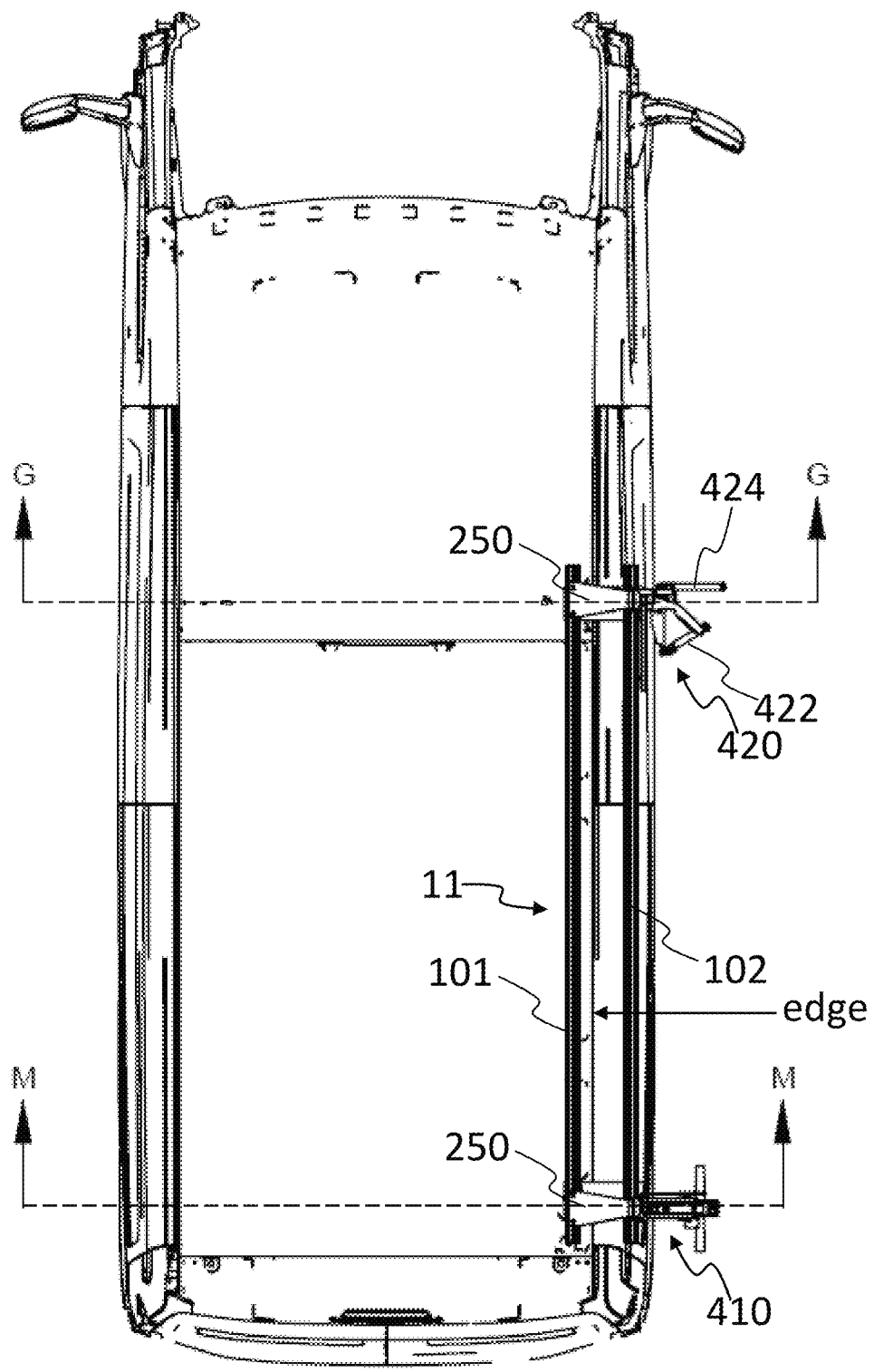
FIG. 5 is a top view illustrating a ladder rack without the ladder, according to an embodiment of the invention.

The ladder tack comprises a supporting arrangement 11 which supports the ladder and the sliding mechanism 400. The exact configuration of the supporting arrangement 11 depends on the vehicle onto which the ladder rack 10 is installed, because the available anchors on the vehicle rooftop (holes, racks. etc. provided on the vehicle by default) depend on each vehicle model, and also because the space between the rooftop and the upper edge of the sliding doors on the side of the vehicle depend on the model too. For example, the exact shape of various members presented in the example below may vary. The supporting arrangement 11 may be anchored at a different number of locations onto the rooftop. Also, as it is well shown in FIG. 1 or 5, the ladder rack 10 does not comprise any element which traverses the rooftop in the transverse direction over the surface of the rooftop (i.e., the ladder rack 10 according to the invention requires not having any transverse bar crossing the rooftop transversely). This ensures that the rooftop is free for purposes other than the ladder rack. The structure of the supporting arrangement 11 extends longitudinally on the edge of the rooftop only and should therefore be adapted to hold the ladder securely and allow loading/unloading without requiring the transverse bars on the rooftop.

According to the exemplary embodiment shown in the figures, in relation with an exemplary vehicle model, the supporting arrangement 11 can comprise a pair of bars, namely a first bar 101 and a second bar 102, which are generally parallel one to the other and extend in a longitudinal direction (i.e., the axis of said bars 101,102, which is a normal setting would be in the longitudinal axis of the vehicle in a front/rear direction). They therefore both extend in the same longitudinal axis, which is also parallel to the vehicle's edge where the pair of bars is being installed. The bars are used to balance the load, i.e., share the ladder weight between the different anchor positions on the rooftop edge (shown as having two anchor locations in figures such as FIG. 1, but could be a different number). The first bar 101 and the second bar 102 should be rigid and rigidly secured together to be able to distribute the weight on their anchors.

According to an embodiment of the invention, the first bar 101 is located on the rooftop, i.e., within the rooftop area relative to the vehicle's edge where the pair of bars is being installed. The second bar 102 is located away from the rooftop, i.e., not over the rooftop area relative to the vehicle's edge. The first bar 101 and the second bar 102 both extend horizontally, at a given height with respect to the vehicle's edge along the rooftop. According to an embodiment, both the first bar 101 and the second bar 102 are located at the same height.

Figure 10:
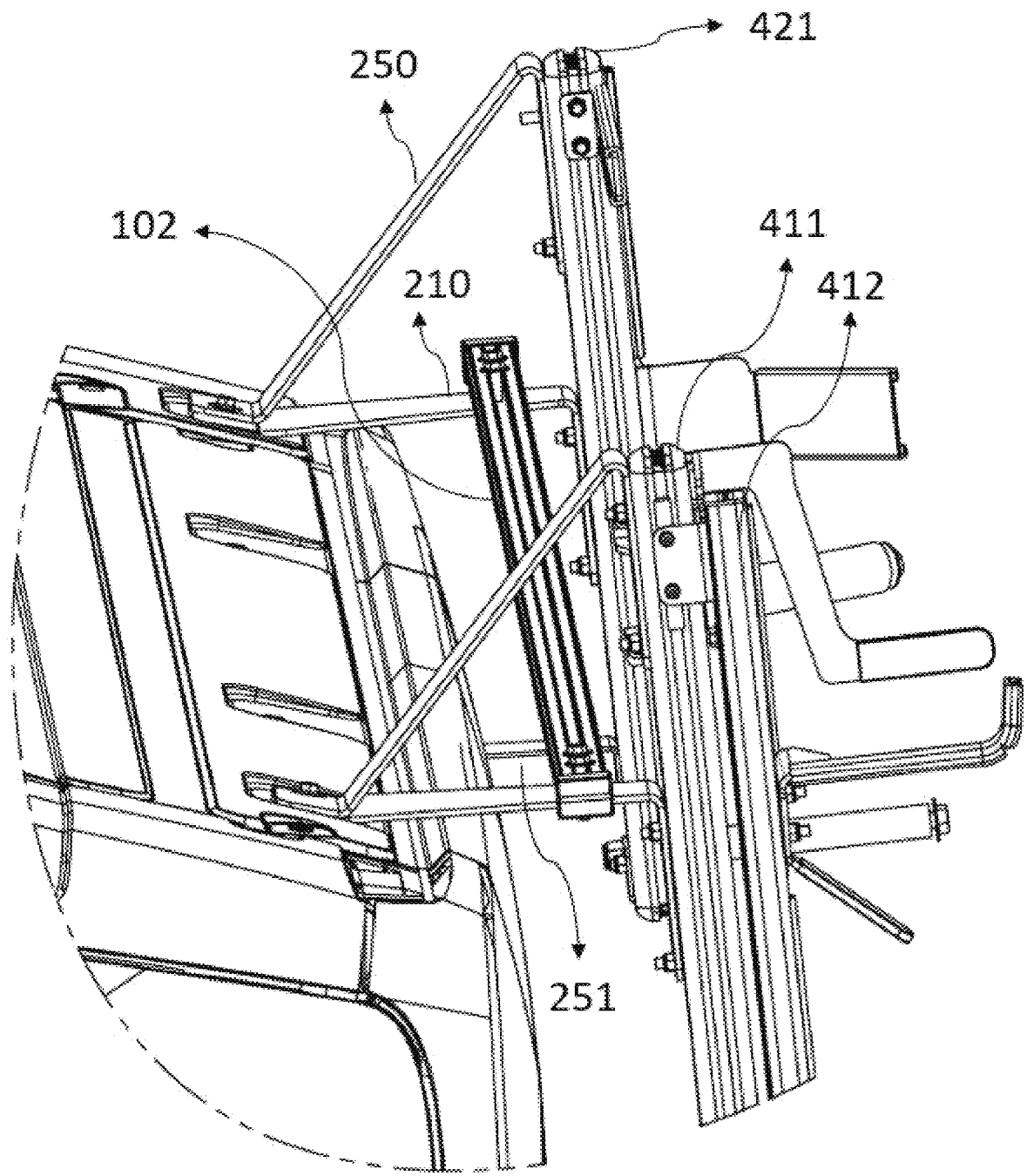
FIGS. 10-11 are photographs illustrating the upper portion of the ladder rack, in particular the first bar and the second bar, according to an embodiment of the invention.
Figure 11:
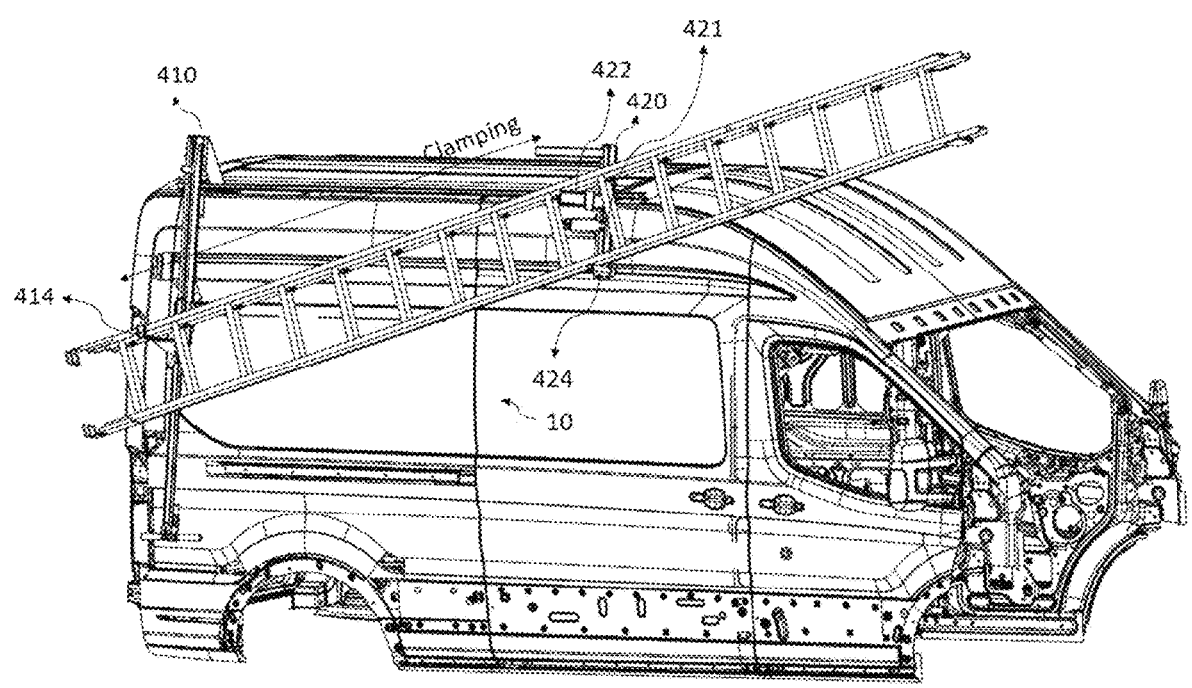

Even though the bars should be parallel in the sense that they extend along the same longitudinal axis with an offset in between, they can be tilted. More specifically, the bars can have a rectangular cross-section, and can have a relative tilt, as shown in FIGS. 9C and 10-11 where the rectangular cross-section defines a plane of extension of the first bar 101 which is shown as being horizontal and the rectangular cross-section of the second bar 102 defines a plane of extension which is shown as tilted with respect to the horizon. They may also have a small difference in height with respect to the edge of the vehicle's rooftop. As shown in the detailed view of FIG. 6, the first bar 101 which lies over the edge of the rooftop is a few centimeters (between 1 and 10 centimeters) higher than the second bar 102 which lies offset from the rooftop (not over the rooftop but away from the edge).

An offset supporting member 210 is provided to hold the second bar 102 in place, laterally away from the vehicle rooftop. The offset is lateral in the sense that the bar is positioned parallel from the vehicle's rooftop edge, away from the rooftop, therefore at the right of the right edge, or at the left of the left edge of the vehicle's rooftop. The second bar 102 still extends longitudinally, but not over the rooftop and not over the edge of the rooftop as for the first bar 101. Instead, the second bar 102 is held in the air, above a location on the corresponding side of the vehicle but not over the vehicle itself. There may also be an additional offset which would be a vertical offset, whereby the second bar 102 can be positioned higher than the rooftop's main surface, as briefly mentioned above. The offset supporting member 210 therefore ensures that the load balancing bars of the supporting arrangement 11 spans across the edge of the roof (as well shown in FIG. 5), i.e., the load of the weight is shared by a load-bearing member (in this embodiment, the bars 101, 102) which is internal to the rooftop edge (first bar 101, although it is close to the edge to avoid occupying space on the rooftop) and another load-bearing member which is external to the rooftop edge (second bar 102). The two load-bearing members, when viewed from the front or rear, are on either side of the edge of the vehicle.

In addition to sharing the weight between different load-bearing members, this configuration which comprises an offset ensures that the ladder can be held in place laterally away from the edge of the rooftop (defining the side of the vehicle) to provide necessary lateral spacing to ensure that the supported ladder does not prevent the opening of the sliding door on the side of the vehicle where the ladder rack 10 is installed.

As mentioned above, the offset supporting member 210 should rigidly connect and secure the second bar 102 to the rooftop. For that purpose, the offset supporting member 210 needs to be rigid and should be fixedly secured to anchors 310 which are located by the edge of the rooftop, on an edge area close to the edge. The shape of the offset supporting member 210 should ensure that the offset supporting member 210 extends away from the anchor, laterally, such that the second bar 102 can be secured to a portion of the offset supporting member 210 which is sufficiently distant from the anchors 310 to be away from the edge of the rooftop while the other bar (first bar 101) is within the edge, over an edge area by the edge. According to an embodiment, a pair of offset supporting members 210 are provided to hold the second bar 102 at two different locations, one in the front and one in the rear, for better support.

Figure 14:
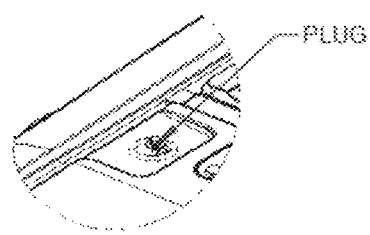

According to an embodiment, the system is anchored in the vehicle anchors which are provide by default on the rooftop, by the edge of the rooftop. As shown in FIGS. 13-14, the vehicle comprises anchors 310 made by the manufacturer at standard, predetermined positions (FIG. 13, which illustrates, without limitation, an exemplary model of a Ford Transit™ vehicle). FIG. 14 shows that accessing these anchors 310 is a matter of removing a plug button, and the anchor 310 is typically surrounded by a standard, slightly recessed area. The proximal portion of each offset supporting member 210 is installed in that slightly recessed area surrounding the anchor 310, as shown in FIG. 11. FIGS. 8A-8B further show that the ladder rack 10 is installed only on one edge area, i.e., along a single edge of the vehicle's rooftop and the anchoring on the rooftop (thus excluding side supports 251) is made solely on the anchors 310 within said edge area along the single edge of the vehicle that was chosen for the installation of the ladder rack 10. The other edge area (i.e., on the other edge of the vehicle) is untouched and the ladder rack does not comprise any member traversing the roof between the opposite edges.

According to an embodiment, securing the members and bars is made by screwing nuts and bolts.

According to an embodiment, the first bar 101 is installed directly above the anchors 310 (which are together spaced apart only in the longitudinal direction on a single edge area of the rooftop). A height spacer 230 may be provided, as best shown in FIG. 11. The spacer 230 ensures that the first bar 101 extends at a height which is at least similar to the height of the second bar 102 (even though a small difference of a few centimeters may still exist between their respective heights). The spacer 230 further facilitates securing the first bar 101 over the same anchors where the offset supporting member 210 was previously installed, since the spacer may have a C-shape cross-section, as shown in FIG. 11, comprises a flat bottom which can easily be secured to the anchors 310 simultaneously with the offset supporting member 210 on the same anchors 310. The first bar 101 may then be secured to an upper portion of the spacer 230, also flat. It should be noted that the supporting arrangement 11 should provide a vertical offset or spacing to ensure that the supported ladder does not prevent the opening of the sliding door on the side of the vehicle where the ladder rack 10 is installed. Depending on the vehicle, the vertical offset may be greater, for example if the top of the sliding door is flush with the rooftop, thereby requiring a higher spacer 230 or any equivalent thereof.

Figure 3:
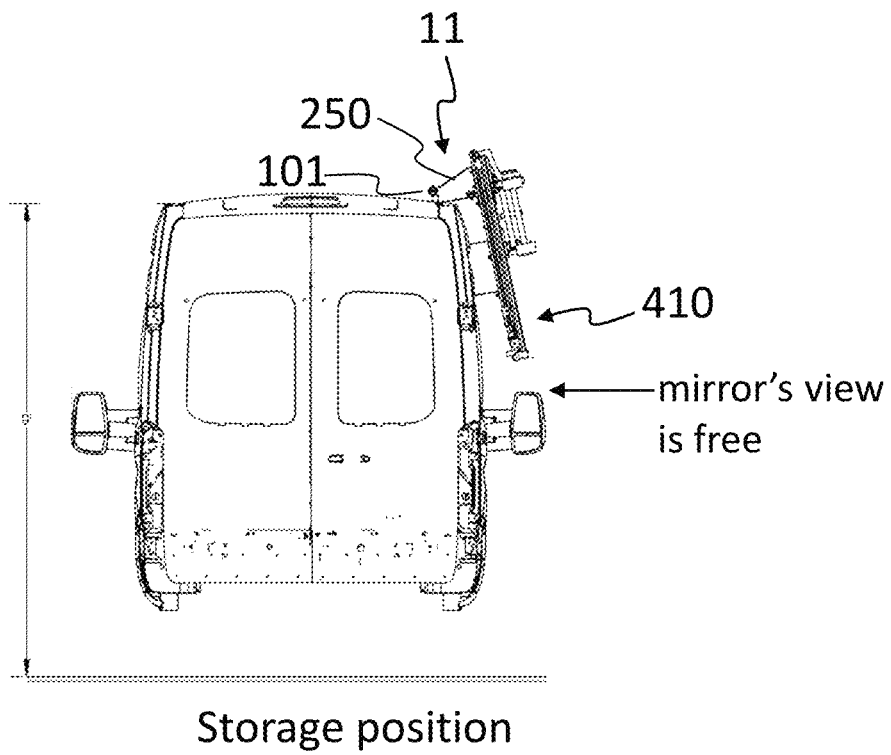
FIG. 3 is a back view illustrating the ladder rack of FIG. 1 in storage position.
Figure 4:
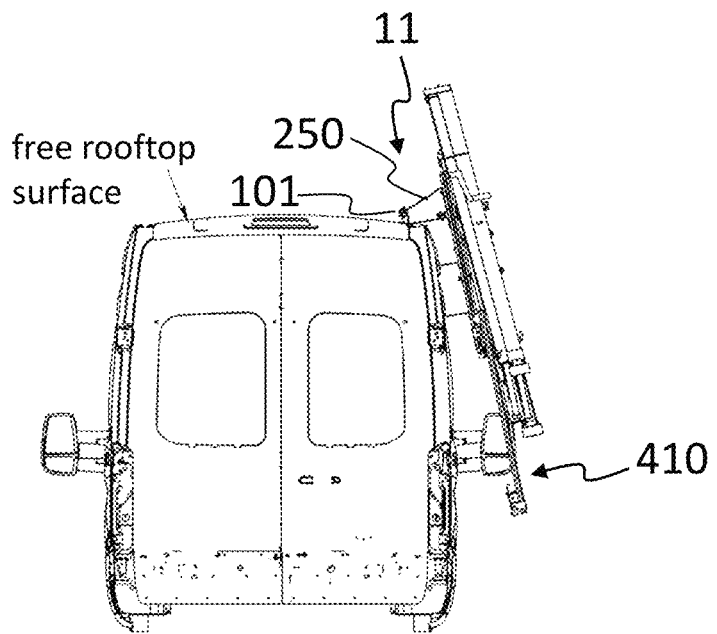
FIG. 4 is a back view illustrating the ladder rack as in FIG. 3, but in loading/unloading position.

A ladder-supporting arrangement for the ladder needs to be provided to hold the ladder. The ladder-supporting arrangement is secured to the load-bearing members which can be embodied as parallel bars 101, 102, which therefore distribute the weight for support of the overall weight by the anchors 310. The ladder needs to undergo transition from a storage position (FIG. 3 or FIG. 12) to a loading/unloading position (FIG. 4 or FIG. 20), and therefore the ladder-supporting arrangement may advantageously be provided as a sliding mechanism 400. There is provided a support 250 which supports the sliding mechanism 400 for the ladder.

Figure 6:
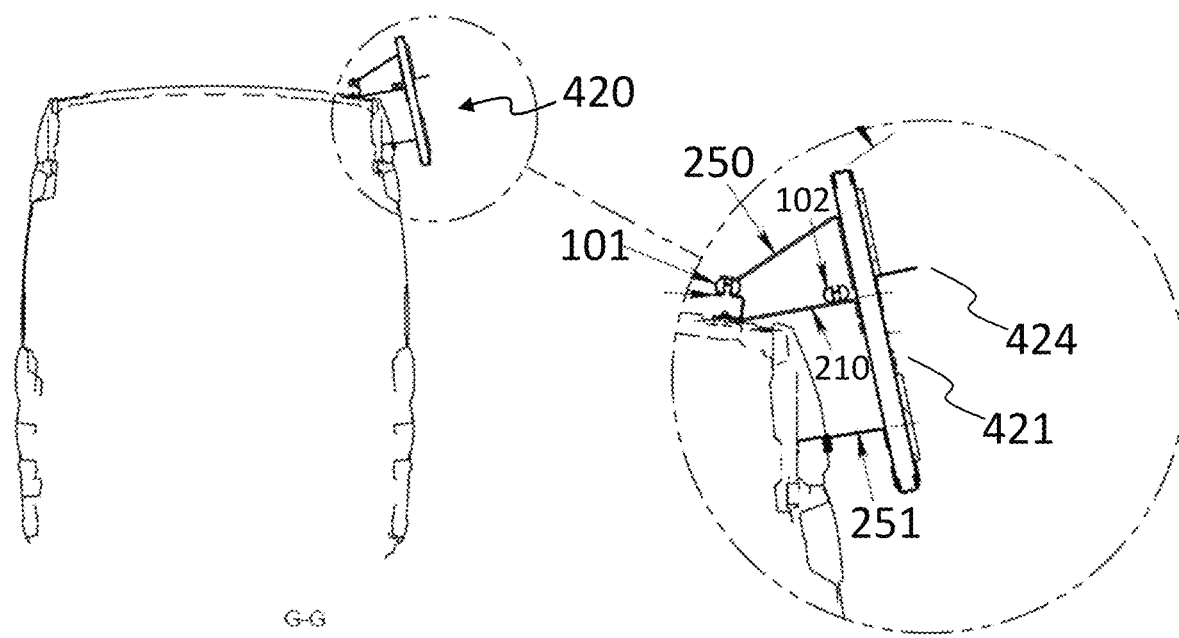
FIGS. 6-7 are cross-sections illustrating the ladder rack from the cross-section axes identified in FIG. 5 and including a detailed view.
Figure 7:
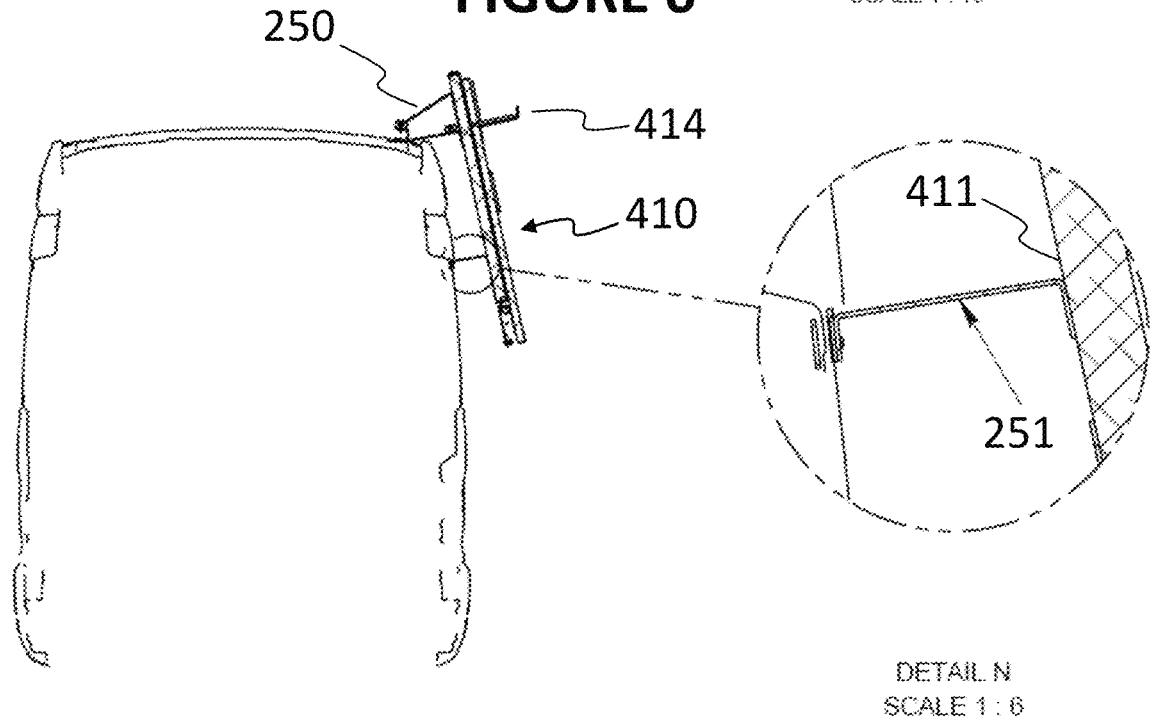

According to an embodiment, the sliding mechanism 400 comprises a sliding bar arrangement 410 (FIG. 7) and a fixed bar arrangement 420 (FIG. 6), each one being held in place by a respective support 250 (as shown in FIGS. 6-7). Each one of the respective supports 250 can be secured to the anchors on the rooftop of the vehicle, along the edge thereof, in a manner similar to the first bar 101. Even more simply, as shown in FIG. 10, the support 250 can be fastened directly to the first bar 101, which is itself secured to the rooftop via the standard anchors of the vehicle.

Also, as shown in FIG. 10, the offset supporting member 210 can in fact comprise two offset supporting members 210, the one at the rear being secured to the sliding bar arrangement 410 and the one at the front being secured to the fixed bar arrangement 420. This offers additional support for the sliding bar arrangement 410 and the fixed bar arrangement 420.

Together, the sliding bar arrangement 410 and the fixed bar arrangement 420 hold respective portions of the ladder, the ladder being either in the loading position (up and horizontal) or in the storage position (downwardly pivoted about the fixed portion which does not move down and therefore stays up at all times). The sliding bar arrangement 410 can undergo a sliding movement, which can be automated or manual, and which makes the transition between the loading position (with the ladder moved down) and the storage position (with the ladder moved up). Since the fixed bar arrangement 420 is fixed, it does not need to be as long as the sliding bar arrangement 410 and is normally shorter, as shown in FIGS. 6-7. Both extend downwardly along the side of the vehicle.

Figure 12:
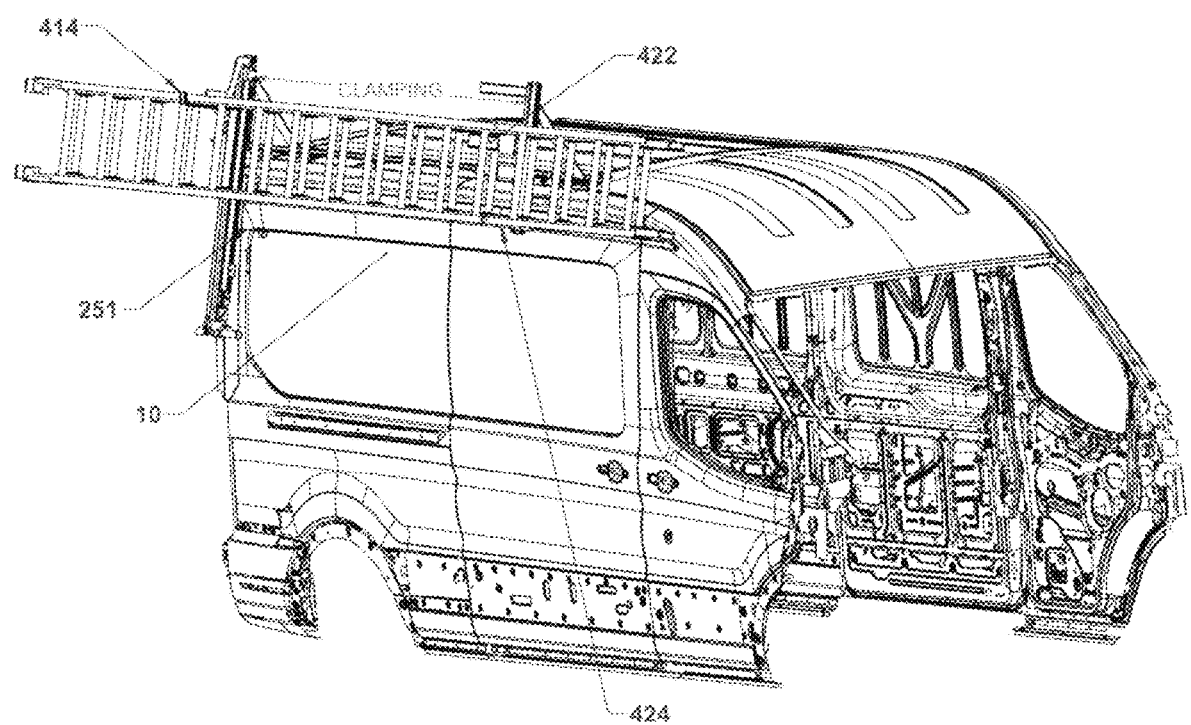
FIG. 12 is a photograph illustrating the ladder rack on the vehicle in storage position, according to an embodiment of the invention.
Figure 20:
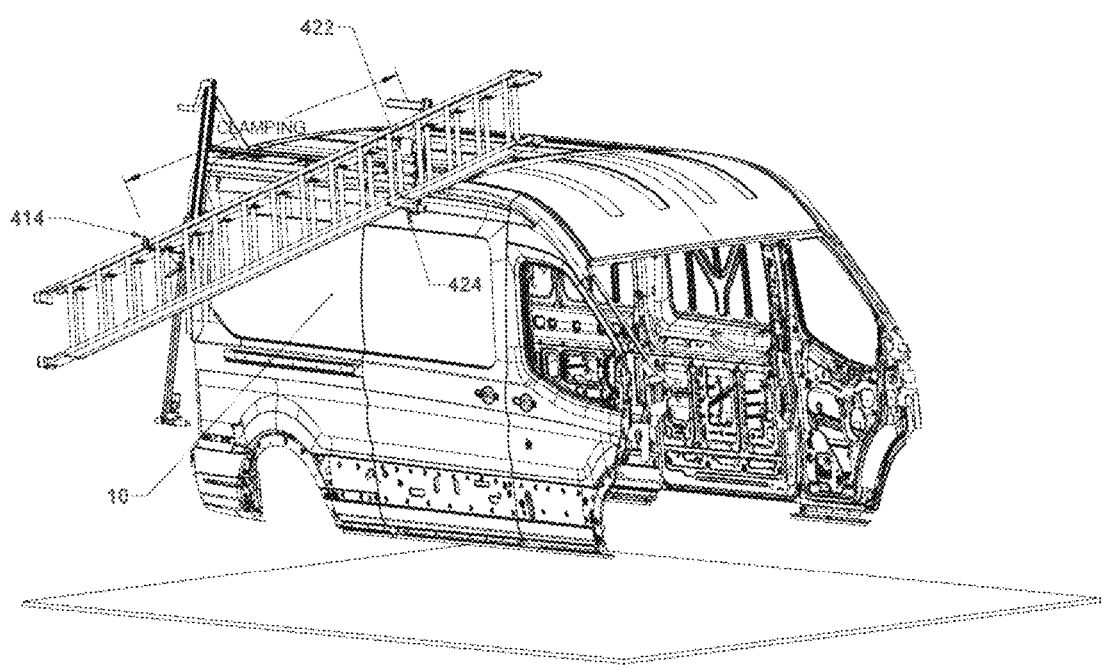
FIG. 20 is a photograph illustrating the ladder rack on the vehicle in loading position, according to an embodiment of the invention.

According to an embodiment, the sliding bar arrangement 410 is located at a rear (or at the front) of the ladder rack 10 and holds the ladder at a corresponding location. Meanwhile, the fixed bar arrangement 420 is located at a more or less opposite position, i.e., at the front (or at the rear) of the ladder rack 10 and holds the ladder at a corresponding location. In this example, the portion of the ladder corresponding to the "front" portion is held in place and does not move up or down, as the fixed bar arrangement 420 is fixed. To keep on with this example, the "rear" portion of the ladder in the ladder rack 10 can be moved up (for storage, as shown in FIG. 12) or down (for loading/unloading, as shown in FIG. 20) by the sliding bar arrangement 410. This implies that the movement of the ladder driven by the sliding mechanism 400 is a pivoting movement, since the rear portion of the ladder is being moved up and down while the front portion is always held up and never brought down by the sliding mechanism 400. ("Rear" and "front" can be interchanged and can be referred more generically as a first portion and a second portion which are opposite in the longitudinal axis along which the ladder rack 10 extends.)

The fixed bar arrangement 420 can comprise an elongated member, namely the fixed bar 421 extending downwardly from the second bar 102. More precisely, the fixed bar 421 extends from the support 250 which holds it at an upper portion thereof. To accommodate this pivoting movement, the fixed bar arrangement comprises two supporting arms 422 and 424, which are fixed and extend away from the vehicle in the lateral direction, as shown in FIG. 9D. Both are located at a downward end of the fixed bar 421 of the fixed bar arrangement 420 and are positioned with a horizontal offset (when viewed from aside) and a vertical offset, thus accommodating the pivoting movement of the ladder by ensuring that there is always at least one of the that supports at least a portion of the weight of the ladder being installed thereon.

The sliding bar arrangement 410 can be made of sliding bars, one of them being a fixed bar 411 acting as a rail and the other one, the sliding bar 412, being free to slide along the fixed bar 411 using a rail arrangement. The fixed bar 411 of the sliding bar arrangement 410 is held in place at an upper portion thereof by its support 250, which can be a different support 250 from the one holding the fixed bar arrangement 420. Contrarily to the fixed bar arrangement 420, the fixed bar 411 of the sliding bar arrangement 410 does not hold in place the ladder. Rather, the sliding bar 412 comprises at least one ladder-supporting grip 414 which supports at least a portion of the weight of the ladder.

Because the ladder is held by the sliding bar 412, the ladder can be moved in accordance with the sliding movement of the sliding bar 412. This movement is dictated as a translation movement of the sliding bar 412 within the rail arrangement between the sliding bar 412 and the fixed bar 411. Stoppers can be provided at both ends to ensure that the sliding movement is restricted.

According to an embodiment, a belt, string, spring or the like can be used as a weight retainer inside the sliding bar arrangement 410 to retain the weight of the ladder to ease the manually operated transition.

According to an embodiment, the sliding bar 412 comprises a handle 415 at an end thereof, as shown in FIG. 9E, for grabbing the sliding bar 412 and move it up or down.

According to an embodiment, the sliding bar arrangement 410 comprises a locking mechanism. For example, as shown in FIG. 9E and better shown in FIG. 15B or 18, the sliding bar 412 can comprise a hingeable hook 418, while the fixed bar 411 comprises a pin 419 onto which the hingeable hook 418 can be hooked or unhooked when the hingeable hook 418 is pivoted for locking or unlocking.

Figure 15A:
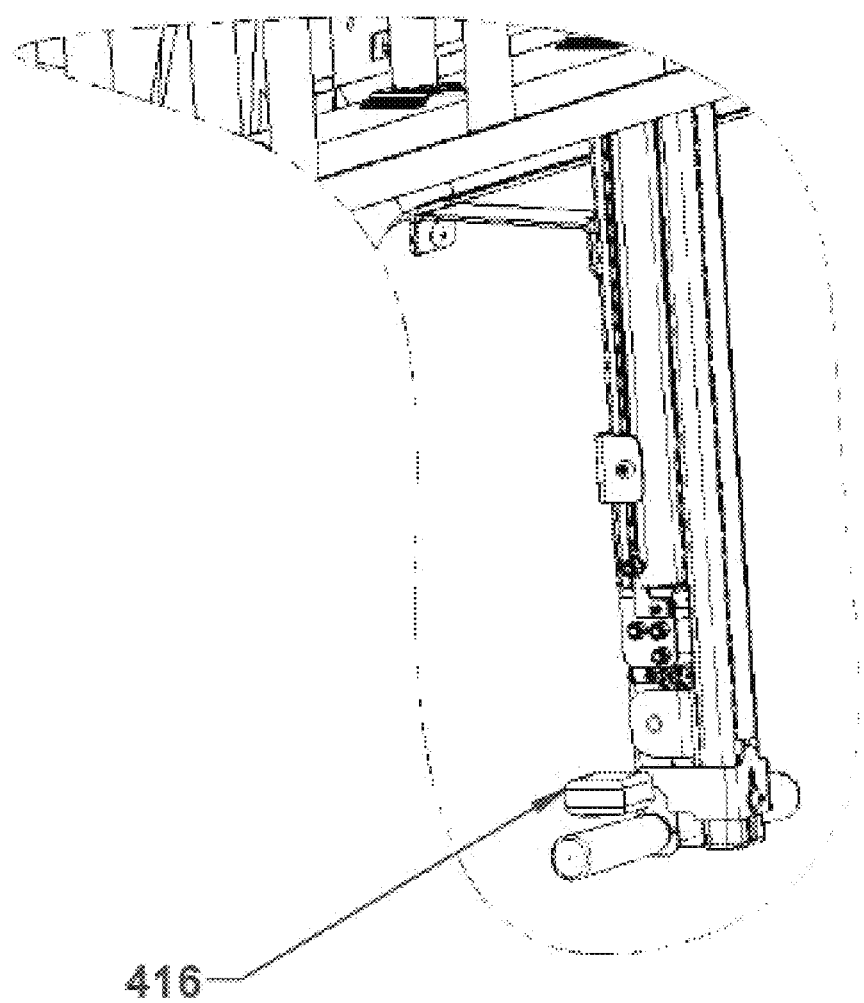
FIGS. 15A to 19 are a perspective view and photographs illustrating a sequence of operations for operating the ladder rack, according to an embodiment; starting from unlocking the sliding bar from the storage position (FIGS. 15A-15B), descending the sliding bar (FIG. 16), reaching the loading/unloading position (FIG. 17), bringing the sliding bar back up to the storage position (FIG. 18) and locking the sliding bar (FIG. 19)

Now referring to FIG. 15A, there is shown a locking mechanism 416 which locks the handle 415 and hingeable hook 418 in place and maintains the inner spring mechanism in place to prevent any longitudinal movement of the sliding bar arrangement 410. A lock can be placed at the bottom of the sliding bar arrangement 410 and serves as antitheft protection, as well as a safety measure which prevents a downfall of the ladder from the storage position when the vehicle is on the road.

Now referring to the photographs of FIGS. 15B through 19, there is shown a sequence of events which can be used to bring the ladder from the storage position to the loading/unloading position, and back to the storage position.

Figure 15B:
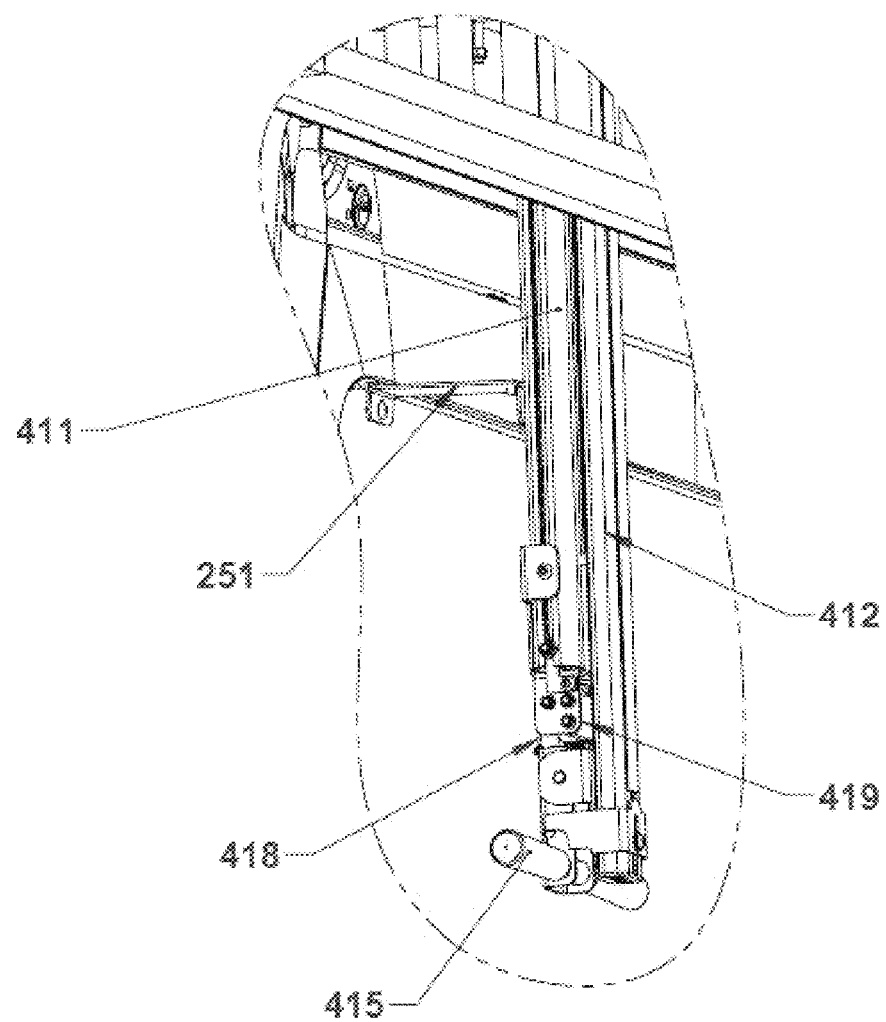

FIG. 15B shows the ladder in the storage position, with the sliding bar arrangement 410 being unlocked. It can be seen that the operator is pulling on the handle 415, which is connected by way of a lever arrangement with the hingeable hook 418, with a pivot pin in between. The hingeable hook 418 is thereby being unhooked from the pin 419 onto which it was previously hooked, thus unlocking the sliding bar arrangement 410.

Figure 16:
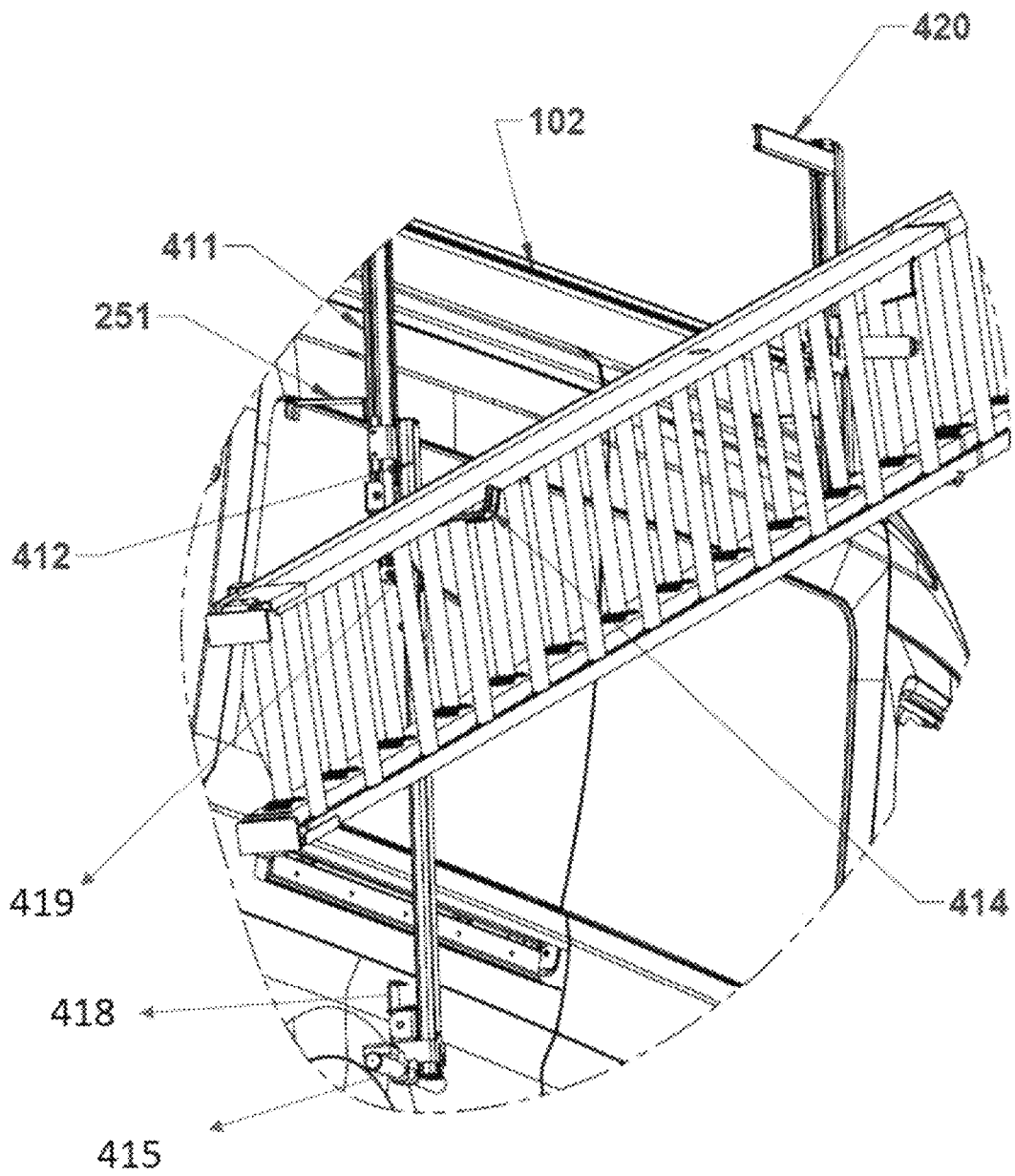

FIG. 16 shows the downward movement of the sliding bar 412, in transition between the upper position to the lower position. The ladder has its "rear" portion being moved down ("rear" being defined with respect to the vehicle).

Figure 17:
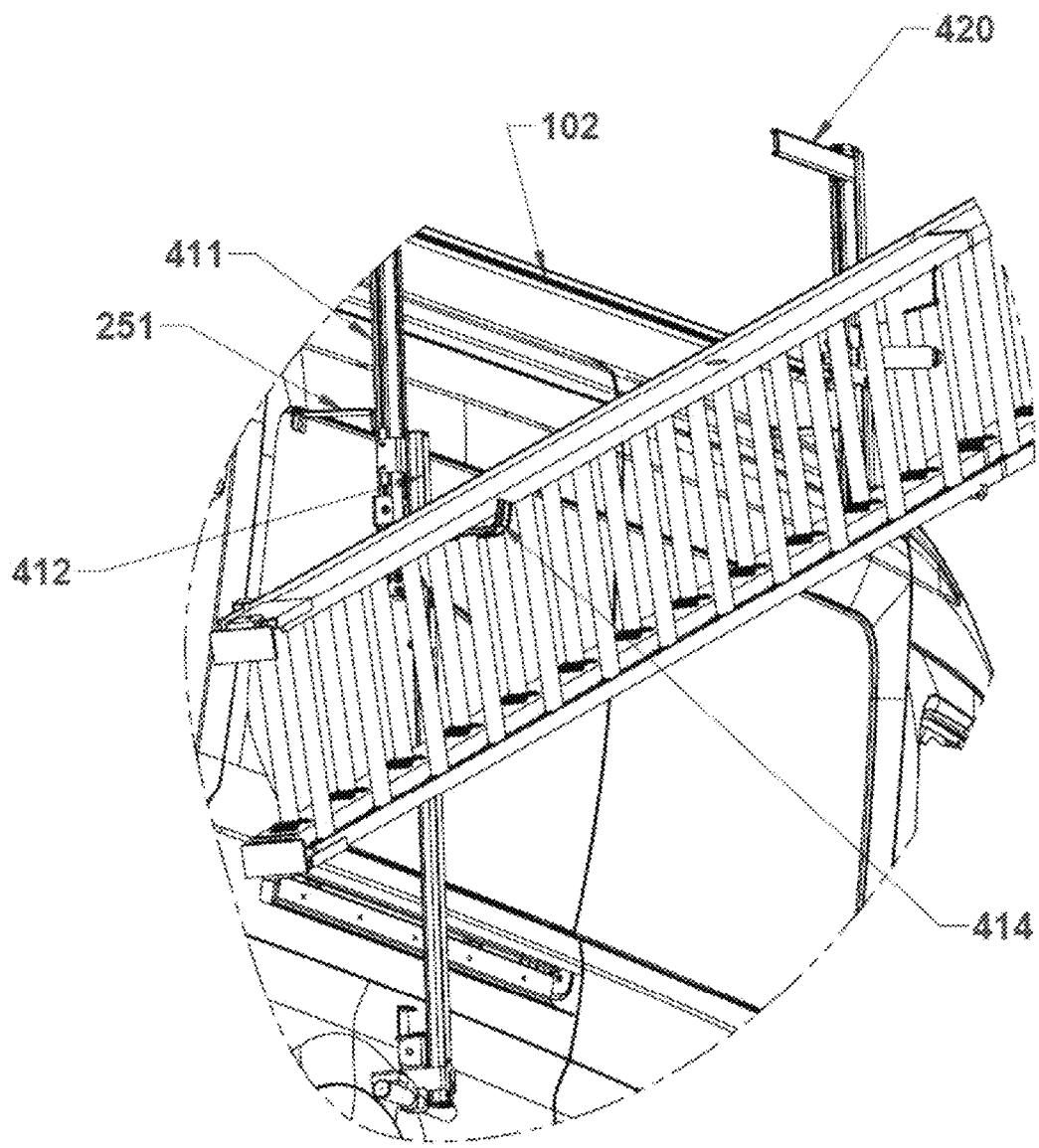

FIG. 17 shows the completed downward movement which brings the ladder, and consequently, the ladder rack 10, into the lowermost position during which the ladder can be loaded onto the ladder rack 10 or unloaded therefrom. The pivoting of the ladder (with respect to the fixed bar arrangement 420) during the change of position is well illustrated.

Figure 18:
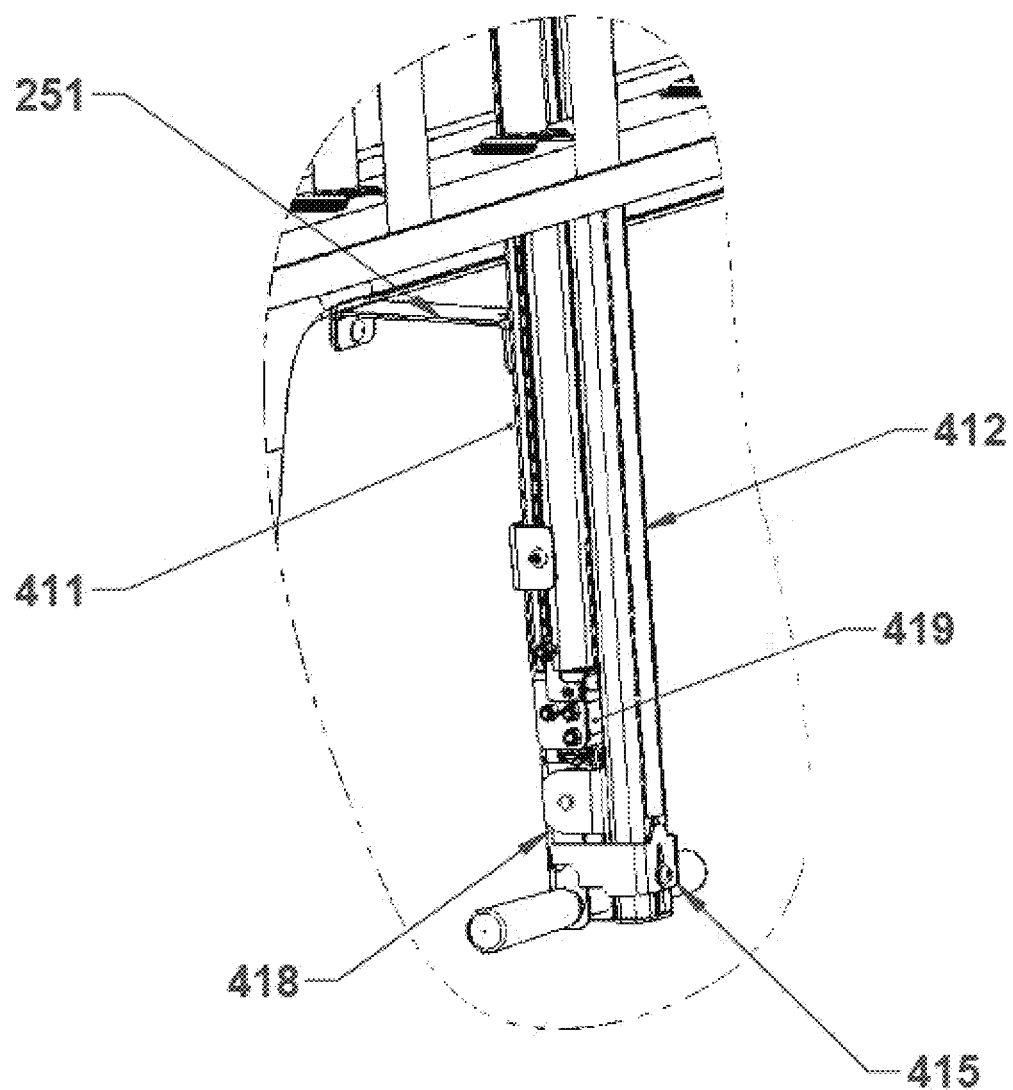

FIG. 18 shows the ladder rack 10 being brought up to its storage position. The operator needs to pull the handle to pivot the hingeable hook 418 for locking.

Figure 19:
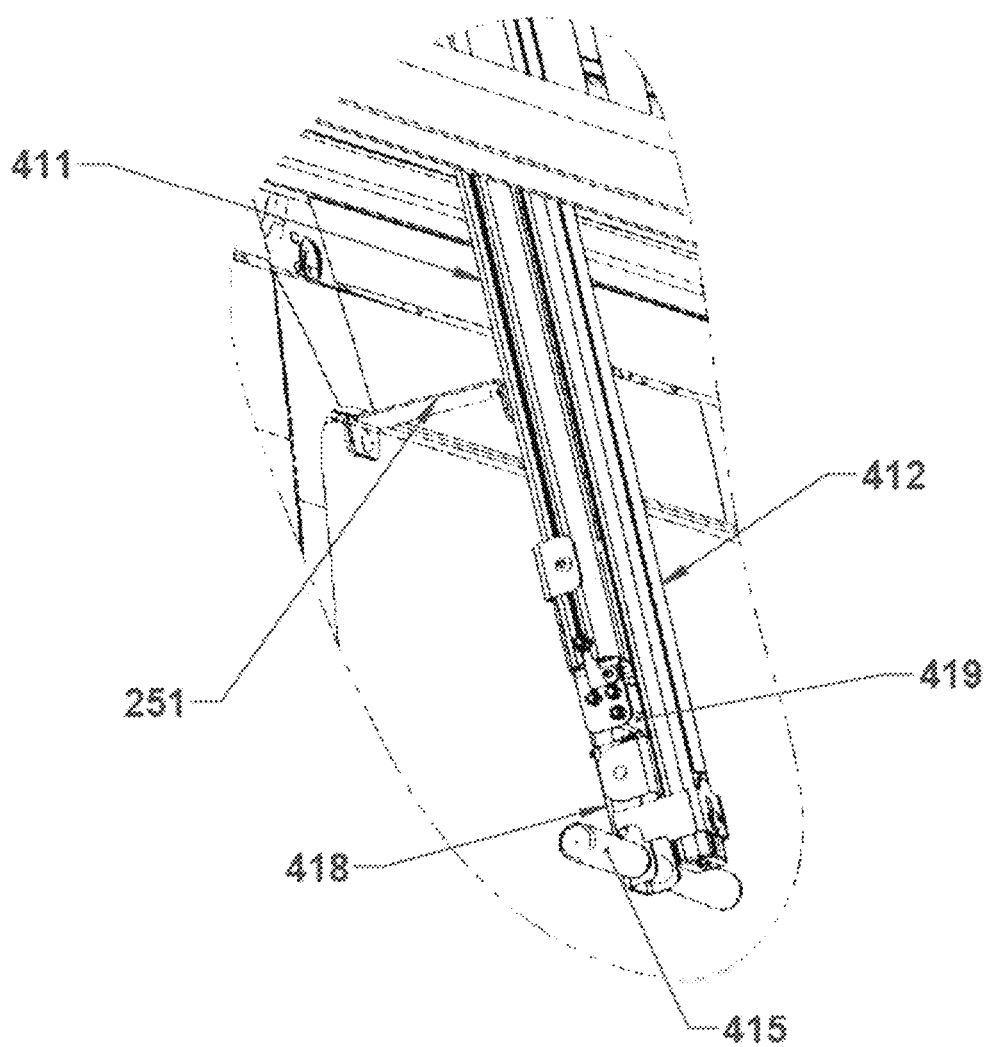

FIG. 19 shows the ladder rack 10 back in storage position, with the ladder brought up and the hingeable hook 418 actually hooked onto the pin 419, thereby locking the sliding bar 412 with the fixed bar 411 to prevent the sliding bar 412 from falling under the weight of the ladder.

The pair of bars 101, 102 make the whole assembly more rigid while holding the bar arrangements 410, 420 and the ladder. According to an embodiment, the first bar 101, the second bar 102 and the bar arrangements 410, 420 are made of extruded aluminum. The offset supporting member 210, spacer 230 and support 250 can rather be made of a thick steel sheet which is bent to have desired shape.

According to an embodiment, for better support of the sliding bar arrangement 410, a wall support 251, shown schematically in FIGS. 6-7, and also shown in FIGS. 9B and 15B-19, can be added to make a rigid connection between the side wall of the vehicle and the fixed bar 411 of the sliding bar arrangement 410. For example, the wall support 251 may take the form of a C-shape rigid member which is fastened to both the side wall of the vehicle and to the inner side of the fixed bar 411, thus making the support of the sliding bar arrangement 410 more rigid and solid. As shown in FIG. 12, the wall support 251 is preferably placed at a location which is not on the sliding door of the vehicle and also not on the path of the sliding door when it is opened. It is shown as being located at a rear portion of the side of the vehicle, immediately rearwardly of the most rearward position reached by the sliding door when the sliding door is opened on that side of the vehicle, therefore not being in the way of the side sliding door.

According to an exemplary embodiment, as shown in FIG. 21, one of the two supporting arms 422 and 424 in the fixed bar arrangement 420, for example the supporting arm 422, can be biased rearwardly, toward the sliding bar arrangement 410. Conversely, the ladder-supporting grip 414 of the sliding bar arrangement 410 can be biased frontwardly, toward the fixed bar arrangement 420. The result is that these members, together, longitudinally clamp the ladder in place. According to another embodiment, these members can have an outward bias, thus clamping the ladder by being biased in opposite directions.

It can be appreciated that the ladder rack disclosed herein has several advantages. Notably, the ladder rack 10 has a very small footprint on the rooftop, only occupying a narrow band along a single edge of the vehicle's rooftop. Most of the space on the rooftop is free to be used for other purposes, such as an aerial lift, an air conditioning system, or even another rack, as the ladder rack 10 has no other component that traverses the rooftop and leaves the other, opposite edge area free. It should be noted that snow removal on the rooftop is an easy task with this ladder rack 10.

The ladder rack 10 can also be provided as a kit which can be installed indifferently on either side of the vehicle.

Moreover, it can be appreciated, for example in FIG. 12, that the ladder does not obstruct the view of the driver from the side mirrors of the vehicle. The ladder is kept high enough when in storage position, to avoid obstructing the side of the vehicle at a location which would be in the field of view when looking through the side mirrors of the vehicle.

Furthermore, as already mentioned above, it can be appreciated, for example in FIG. 12, that the ladder rack 10 and the ladder itself do not preempt the user from opening any door of the truck. For example, the supporting arrangement 11 spans across the edge of the vehicle to provide the required lateral and vertical offsets to ensure that the ladder is held laterally away from the side of the vehicle, without having a support anchored on the side, thus allowing the opening of the sliding doors on the side even though the ladder is in the ladder rack 10. Even more generally, when the ladder is in the storage position, all doors can be opened or closed freely, without any obstruction. The same is true of the ladder is brought down. Typically, in prior art systems, there would be for example, a pivoting handle which prevents the opening of the back door, or the descending ladder would prevent the opening of the sliding side door of the vehicle. In the present case, there is no handle or mechanism ever reaching the back door of the vehicle, and the ladder or sliding arrangement 410 can be kept away from the side of the vehicle with a sufficient offset to ensure that the sliding side door of the vehicle can be opened or closed freely.

Another advantage is that the second bar 102 can replace the edge of the vehicle's rooftop when there is a need to lean an object, such as the ladder onto the vehicle. Indeed, the second bar 102 is located laterally away from the edge of the rooftop of the vehicle, and it becomes available for leaning objects which are tall enough to reach this height. For example, there may be a time when the person unloads the ladder from the ladder rack 10 and uses it for particular purposes. At the end of their work, the user may want to lean the ladder onto the vehicle without specifically loading it back onto the ladder rack 10. Typically, the user would lean the rack onto the vehicle, although the ladder may scratch the paint finish on the vehicle. With the ladder rack 10 as currently described, the user may instead lean the ladder onto the second bar, thus avoiding damaging the paint finish of the vehicle and having the second bar 102 used instead to protect the vehicle's finish.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A ladder rack for supporting a ladder on a vehicle, the ladder rack comprising:
 a supporting arrangement anchored on a rooftop of the vehicle having two edges, the supporting arrangement anchored only along a single edge thereof, and comprising bars spanning across the single edge of the rooftop, on either side of the single edge and being both parallel to the single edge of the rooftop of the vehicle, a weight of the ladder being distributed by the bars;
 a fixed bar arrangement for holding a first portion of the ladder, the fixed bar arrangement being secured to the supporting arrangement;
 a sliding bar arrangement comprising a fixed bar secured to the supporting arrangement and a sliding bar, in sliding arrangement with the fixed bar, for holding a second portion of the ladder, for sliding upwardly or downwardly and pivot the ladder with respect to the first portion held by the fixed bar arrangement;
 wherein the vehicle comprises a sliding door on a same side of the vehicle as the ladder rack, wherein the fixed bar comprises a wall support member which secures the fixed bar to a side wall portion of the vehicle which is not the sliding door and which is rearward from a most rearward location reachable by the sliding door; and
 wherein the ladder rack only occupies a narrow band along the single edge of the rooftop;
 and wherein the ladder is always located laterally away from the edge of the rooftop, on a side of the vehicle.

2. The ladder rack of claim 1, wherein the bars distributing the weight of the ladder comprise a first bar and a second bar, wherein the supporting arrangement is secured to anchors at predetermined locations on the rooftop of the vehicle, the ladder rack further comprising an offset supporting member which supports the second bar with a lateral offset relative to the first bar, the offset supporting member being also secured to the anchors.

3. The ladder rack of claim 2, wherein the anchors at predetermined locations on the rooftop of the vehicle are located on a same edge area by the single edge of the rooftop, while any anchors on an other opposite one of the two edges of the vehicle are not used for anchoring the ladder rack.

4. The ladder rack of claim 2, wherein the offset supporting member is provided in a pair, one being secured to the fixed bar arrangement, and another one secured to the fixed bar of the sliding bar arrangement.

5. The ladder rack of claim 4, further comprising a support, provided in a pair secured to the first bar, one being further secured to the fixed bar arrangement, and another one further secured to the fixed bar of the sliding bar arrangement.

6. The ladder rack of claim 1, wherein the bars distributing the weight of the ladder comprise a first bar and a second bar, further comprising a spacer between the anchors and the first bar to ensure the first bar and the second bar are approximately at a same height relative to the rooftop.

7. A ladder rack for supporting a ladder on a vehicle, the ladder rack comprising: a supporting arrangement anchored only along a single edge area of a rooftop, the supporting arrangement comprising a first load-bearing member entirely extending over the rooftop within an edge of the rooftop and a second load-bearing member extending substantially parallel to the first load-bearing member with a lateral offset, outside the rooftop and away from the edge of the rooftop; and a ladder-supporting arrangement for holding the ladder, the ladder-supporting arrangement connecting to the first load-bearing member and to the second load-bearing member for supporting a weight of the ladder, the ladder-supporting arrangement comprising a fixed bar arrangement for holding a first portion of the ladder, the fixed bar arrangement being secured to the supporting arrangement; wherein the vehicle comprises a sliding door on a same side of the vehicle as the ladder rack, wherein the fixed bar comprises a wall support member which secures the fixed bar to a side wall portion of the vehicle which is not the sliding door and which is rearward from a most rearward location reachable by the sliding door; and wherein the ladder rack only occupies a narrow band along the single edge of the rooftop; and wherein the ladder is always located laterally away from the edge of the rooftop, on a side of the vehicle.

8. The ladder rack of claim 7, wherein the first load-bearing member entirely extends over said single edge area the rooftop, leaving a remainder of the rooftop free from the supporting arrangement of the ladder rack.

9. The ladder rack of claim 8, wherein the first load-bearing member is a first bar and second load-bearing member is a second bar, wherein the supporting arrangement is secured only to anchors at predetermined locations in the single edge to leave free any other anchor of the vehicle not within the single edge area.

10. The ladder rack of claim 9, the ladder rack further comprising an offset supporting member which supports the second bar with a lateral offset relative to the first bar, the offset supporting member being also secured to the anchors.

11. The ladder rack of claim 10, wherein the ladder-supporting arrangement comprises a sliding bar arrangement comprising a fixed bar secured to the supporting arrangement and a sliding bar, in sliding arrangement with the fixed bar, for holding a second portion of the ladder, for sliding upwardly or downwardly and pivot the ladder with respect to the first portion held by the fixed bar arrangement.

12. The ladder rack of claim 11, wherein the offset supporting member is provided in a pair, one being secured to the fixed bar arrangement, and another one secured to the fixed bar of the sliding bar arrangement.

13. The ladder rack of claim 12, further comprising a support, provided in a pair secured to the first bar, one being further secured to the fixed bar arrangement, and another one further secured to the fixed bar of the sliding bar arrangement.

14. The ladder rack of claim 8, further comprising a spacer between the anchors and the first load-bearing member to ensure the first load-bearing member and the second load-bearing member are approximately at a same height relative to the rooftop.

15. The ladder rack of claim 14, wherein the spacer maintains the first load-bearing member and the second load-bearing member with an angular tilt relative to each other.

* * * * *